(12) United States Patent
Chen et al.

(10) Patent No.: US 8,009,178 B2
(45) Date of Patent: Aug. 30, 2011

(54) AUGMENTING IMAGES FOR PANORAMIC DISPLAY

(75) Inventors: Billy P. Chen, Bellevue, WA (US); Eyal Ofek, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 535 days.

(21) Appl. No.: 11/771,434

(22) Filed: Jun. 29, 2007

(65) Prior Publication Data

US 2009/0002394 A1 Jan. 1, 2009

(51) Int. Cl.
G09G 5/00 (2006.01)

(52) U.S. Cl. ............................ 345/629; 345/419; 348/39

(58) Field of Classification Search ........................ None
See application file for complete search history.

(56) References Cited

U.S. PATENT DOCUMENTS

| | | | |
|---|---|---|---|
| 4,661,811 A * | 4/1987 | Gray et al. | 345/636 |
| 4,835,532 A * | 5/1989 | Fant | 345/611 |
| 5,130,794 A | 7/1992 | Ritchey | |
| 5,646,679 A | 7/1997 | Jano et al. | |
| 5,657,073 A | 8/1997 | Henley | |
| 5,890,092 A * | 3/1999 | Kato et al. | 701/216 |
| 6,222,583 B1 * | 4/2001 | Matsumura et al. | 348/113 |
| 6,301,447 B1 | 10/2001 | Jackson | |
| 6,665,003 B1 | 12/2003 | Peleg | |
| 6,714,249 B2 | 3/2004 | May | |
| 6,788,333 B1 | 9/2004 | Uyttendaele | |
| 7,010,158 B2 * | 3/2006 | Cahill et al. | 382/154 |
| 7,012,669 B2 | 3/2006 | Streid | |
| 7,064,783 B2 | 6/2006 | Colavin | |
| 7,180,529 B2 | 2/2007 | Covannon | |
| 7,353,114 B1 * | 4/2008 | Rohlf et al. | 702/5 |
| 7,583,275 B2 * | 9/2009 | Neumann et al. | 345/633 |
| 2004/0174386 A1 | 9/2004 | Kotake et al. | |
| 2004/0196282 A1 * | 10/2004 | Oh | 345/419 |
| 2004/0233070 A1 * | 11/2004 | Finnern | 340/995.13 |
| 2005/0177350 A1 * | 8/2005 | Kishikawa | 703/1 |
| 2006/0111822 A1 * | 5/2006 | Simon | 701/29 |
| 2006/0111839 A1 * | 5/2006 | Han | 701/213 |

(Continued)

FOREIGN PATENT DOCUMENTS

JP 09062861 3/1997

(Continued)

OTHER PUBLICATIONS

International Search Report with Written Opinion, dated Nov. 13, 2008.

(Continued)

Primary Examiner — Andrew Wang
Assistant Examiner — David H Chu
(74) Attorney, Agent, or Firm — Shook, Hardy & Bacon L.L.P.

(57) ABSTRACT

Methods and systems are provided methods and systems for augmenting image data (e.g., still image data or video image data) utilizing image context data to generate panoramic images. In accordance with embodiments hereof, a position and orientation of received image data is utilized to identify image context data (e.g., three-dimensional model data, two-dimensional image data, and/or 360° image data from another source) rendered based upon the same position or a nearby position relative to the image data and the image data is augmented utilizing the identified context data to create a panoramic image. The panoramic image may then be displayed (e.g., shown on a LCD/CRT screen or projected) to create a user experience that is more immersive than the original image data could create.

20 Claims, 3 Drawing Sheets

U.S. PATENT DOCUMENTS

| | | | |
|---|---|---|---|
| 2006/0132482 A1* | 6/2006 | Oh | 345/419 |
| 2006/0181619 A1 | 8/2006 | Liow | |
| 2006/0253246 A1* | 11/2006 | Cera et al. | 701/117 |
| 2007/0025723 A1 | 2/2007 | Baudisch | |
| 2007/0249368 A1* | 10/2007 | Bailly et al. | 455/457 |
| 2007/0282792 A1* | 12/2007 | Bailly et al. | 707/2 |
| 2008/0016472 A1* | 1/2008 | Rohlf et al. | 715/848 |
| 2008/0143709 A1* | 6/2008 | Fassero et al. | 345/419 |
| 2008/0291217 A1* | 11/2008 | Vincent et al. | 345/629 |

FOREIGN PATENT DOCUMENTS

| | | |
|---|---|---|
| JP | 2003337940 | 11/2003 |

OTHER PUBLICATIONS

Thomas Pintaric, Ulrich Neumann, Albert Rizzo, Immersive Panoramic Video, http://graphics.usc.edu/cgit/pdf/papers/MM2Kpanodemo.pdf, Integrated Media Systems Center, Los Angeles, California, USA.

Shenchang Eric Chen, QuickTime VR—An Image-Based Approach to Virtual Environment Navigation http://delivery.acm.org/10.1145/220000/218395/p29-chen.pdf? key1=218395&key2=8083168711&coll=Portal&dl=GUIDE&CFID=17286036&CFTOKEN=40030580, 1995.

Zhang, Zhengyou, "A Flexible New Technique for Camera Calibration", Technical Report MSR-TR-98-71, Microsoft Corporation, Redmond, Washington, Dec. 2, 1998, pp. 1-22.

Nayar, Shree K., et al., "A Projection System with Radiometric Compensation for Screen Imperfections", Department of Computer Science, Columbia University, New York, New York, pp. 1-8. 2003.

Fujii, Kensaku, et al., "A Projector-Camera System with Real-Time Photometric Adaptation for Dynamic Environments", Computer Vision and Pattern Recognition, 2005. CVPR 2005. IEEE Computer Society Conference, Jun. 20-25, 2005, vol. 2, p. 1180.

Raskar, Ramesh, et al., "iLamps: Geometrically Aware and Self-Configuring Projectors", ACM SIGGRAPH 2003 Conference Proceedings, Mitsubishi Electric Research Labs, Cambridge, Massachusetts, pp. 1-10.

Wilson, Andrew D., "PlayAnywhere: A Compact Interactive Tabletop Projection-Vision System", UIST'05, Oct. 23-27, 2005, Seattle, Washington, pp. 1-10.

Welch, Gregg, et al., "Projected Imagery in Your Office of the Future", IEEE Computer Graphics and Applications, Jul.-Aug. 2000, pp. 62-67.

Cruz-Neira, Carolina, et al., "Surround-Screen Projection-Based Virtual Reality: The Design and Implementation of the CAVE", International Conference on Computer Graphics and Interactive Techniques, Proceedings of the 20th Annual Conference on Computer Graphics and Interactive Techniques, 1993, pp. 135-142, http://doi.acm.org/10.1145/166117.166134.

Raskar, Ramesh, et al., "The Office of the Future: A Unified Approach to Image-Based Modeling and Spatially Immersive Displays", SIGGRAPH 98, Orlando, Florida, Jul. 19-24, 1998, pp. 1-10.

Wilson, Andrew, et al., "XWand: UI for Intelligent Spaces", CHI 2003, Apr. 5-10, 2003, Fort Lauderdale, Florida, pp. 1-8.

Luc Courchesene, Guillaume Langlois, Luc Martinez, Where are you? An immersive experience in the Panoscope 360°, http://delivery.acm.org/10.1145/1190000/1180864/p1027-courchesne.pdf?key1=1180864&key2=5303168711&coll=&dl=&CFID=15151515&CFTOKEN=6184618, Oct. 23-27, 2006, Santa Barbara, California, USA.

* cited by examiner

AUGMENTING IMAGES FOR PANORAMIC DISPLAY

BACKGROUND

When image data is received from most readily available consumer image capture devices, it has a limited viewing angle. For instance, a still image taken with a standard consumer digital camera may include an image of a car on a street surrounded by tall buildings. However, due to the limited viewing angle, it may be very difficult to determine where the still image was actually taken and/or to create a feeling of what it was like to be at the location where the still image was taken.

Image capture devices exist for capturing images with a more expansive viewing angle than readily available consumer image capture devices. However, such devices are typically more costly and more complex than the average consumer desires.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Embodiments of the present invention relate to augmenting image data (e.g., still image data or video image data) with image or 3D context data to create panoramic images. A position and orientation of received image data is utilized to identify image context data (e.g., three-dimensional model data, two-dimensional image data, and/or 360° image data from another source) rendered based upon the same position or a nearby position relative to the image data and the image data is augmented utilizing the identified context data to create a panoramic image. The panoramic image may then be displayed (e.g., shown on a LCD/CRT screen or projected) to create a user experience that is more immersive than the original image data could create.

BRIEF DESCRIPTION OF THE DRAWINGS

The present invention is described in detail below with reference to the attached drawing figures, wherein.

DETAILED DESCRIPTION

Figure 1:
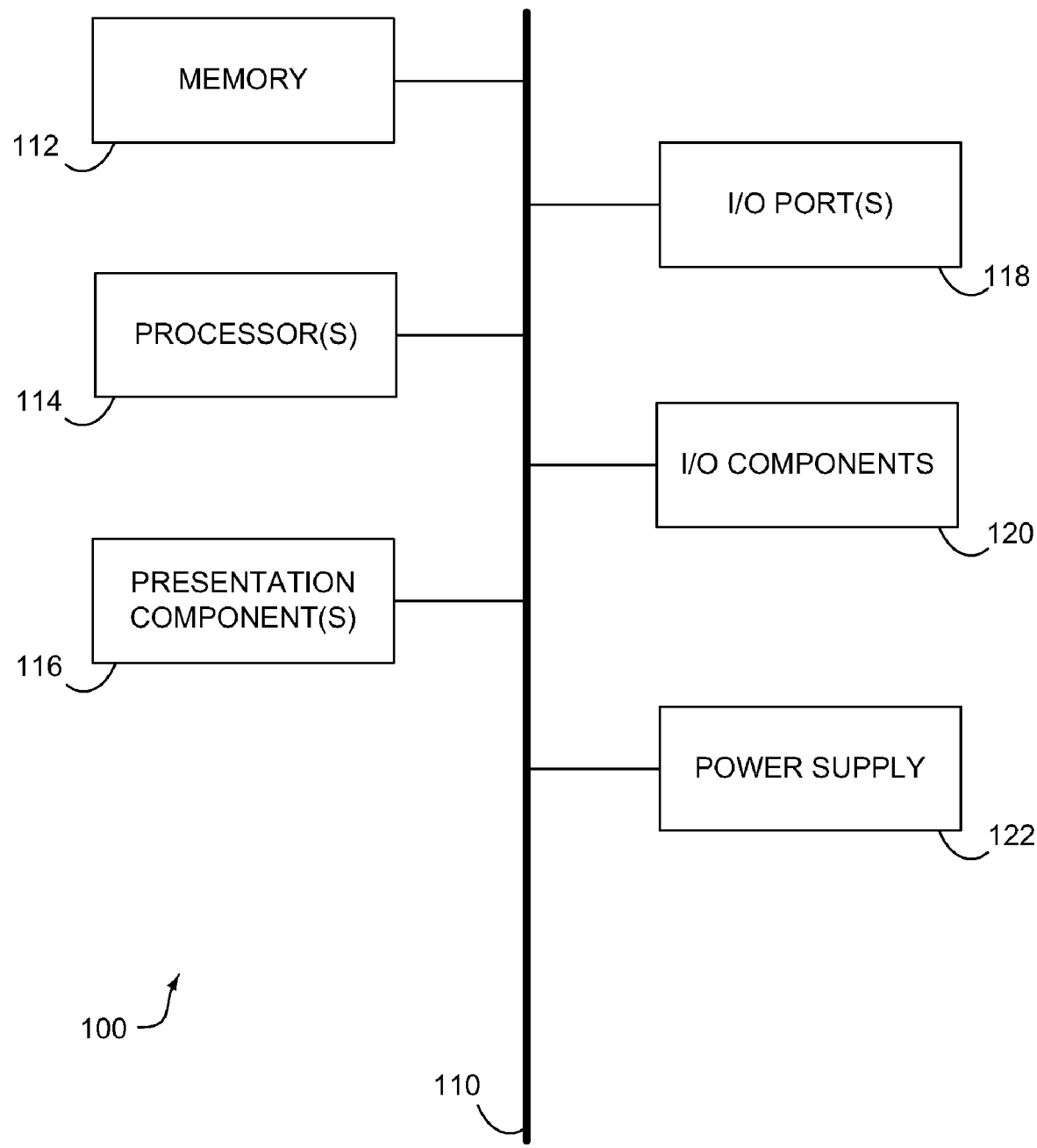
FIG. 1 is a block diagram of an exemplary computing environment suitable for use in implementing embodiments of the present invention.

The subject matter of the present invention is described with specificity herein to meet statutory requirements. However, the description itself is not intended to limit the scope of this patent. Rather, the inventor has contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention provide methods and systems for augmenting image data (e.g., still image data or video image data) utilizing image context data to generate panoramic images. In accordance with embodiments hereof, a position and orientation of received image data is utilized to identify image context data (e.g., three-dimensional model data, two-dimensional image data, and/or 360° image data from another source) rendered based upon the same position or a nearby position relative to the image data and the image data is augmented utilizing the identified context data to create a panoramic image. The panoramic image may then be displayed (e.g., shown on a LCD/CRT screen or projected) to create a user experience that is more immersive than the original image data could create.

Accordingly, in one aspect, the present invention provides one or more computer-readable media having computer-executable instructions embodied thereon for performing a method for generating panoramic images. The method includes receiving image data having a known position and orientation from a first source (e.g., an image capture device), receiving image context data (e.g., three-dimensional model data) from a second source, augmenting the image data with the image context data to generate a panoramic image, and storing and/or displaying the generated panoramic image.

In another aspect, the present invention provides a method for augmenting image data. The method includes receiving image data having a known position (e.g., based on a coordinate system) and orientation and determining if image context data (e.g., three-dimensional model data) is available that includes the known position. If it is determined that image context data is not available that includes the known position, the method further includes receiving image context data having a position near the known position (e.g., image context data having coordinates within a pre-determined proximity of coordinates associated with the image data), augmenting the image data with the image context data to generate augmented image data, and storing and/or displaying the augmented image data.

In a further aspect, the present invention provides a computerized system for generating panoramic images. The system includes an image receiving component, an image context receiving component, a panoramic extrapolation component, and a storage component. The image receiving component is configured for receiving image data (e.g., still image data and/or video image data) having a known position and orientation. The image context receiving component is configured for receiving image context data (e.g., three-dimensional model data) having a known position and orientation. The panoramic extrapolation component is configured for extrapolating received image data in at least one direction utilizing received image context data to create a panoramic image. The storage component (e.g., a database or database cluster) is configured for storing at least one of the image context data and the panoramic image. In embodiments, the system may further include one or more of a panoramic display component configured for transmitting the panoramic image to at least one display device and a determining component configured for determining if image context data is available that includes context coordinates that are the same as the image coordinates associated with received image data.

Having briefly described an overview of embodiments of the present invention, an exemplary operating environment suitable for implementing the present invention is described below.

Referring to the drawings in general, and initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing environment 100 be interpreted as having any dependency or requirement relating to any one or combination of components/modules illustrated.

The invention may be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implement particular abstract data types. Embodiments of the present invention may be practiced in a variety of system configurations, including hand-held devices, consumer electronics, general-purpose computers, specialty computing devices, etc. Embodiments of the invention may also be practiced in distributed computing environments where tasks are performed by remote-processing devices that are linked through a communications network.

With continued reference to FIG. 1, computing device 100 includes a bus 110 that directly or indirectly couples the following devices: memory 112, one or more processors 114, one or more presentation components 116, input/output (I/O) ports 118, I/O components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors hereof recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computer" or "computing device."

Computing device 100 typically includes a variety of computer-readable media. By way of example, and not limitation, computer-readable media may comprise Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices, carrier wave or any other medium that can be used to encode desired information and be accessed by computing device 100.

Memory 112 includes computer-storage media in the form of volatile and/or nonvolatile memory. The memory may be removable, non-removable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc. I/O ports 118 allow computing device 100 to be logically coupled to other devices including I/O components 120, some of which may be built in. Illustrative components include a microphone, joystick, game pad, satellite dish, scanner, printer, wireless device, etc.

Figure 2:
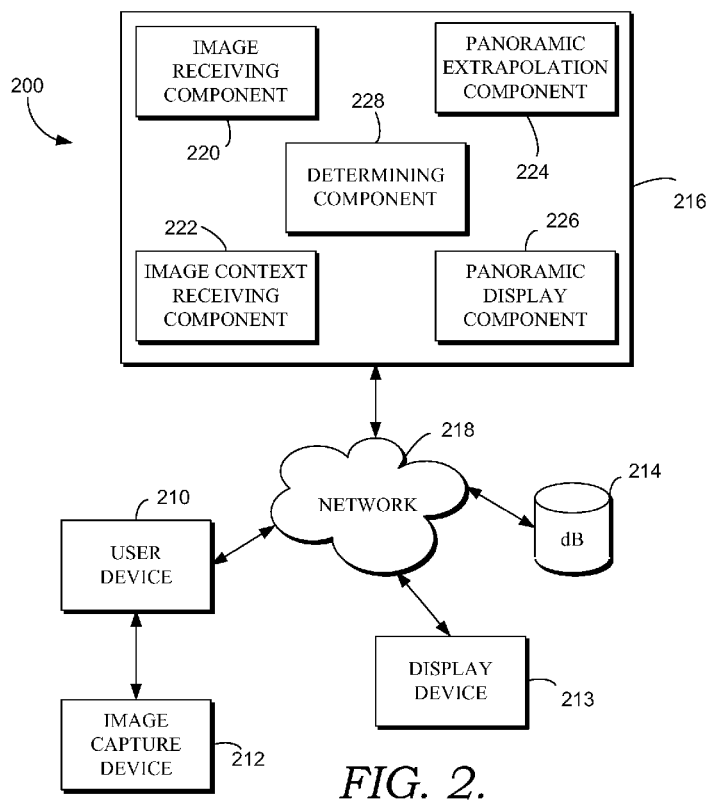
FIG. 2 is a block diagram of an exemplary computing system architecture suitable for use in implementing embodiments of the present invention.

Turning now to FIG. 2, a block diagram is illustrated that shows an exemplary computing system architecture 200 configured to generate panoramic images, in accordance with an embodiment of the present invention. It will be understood and appreciated by those of ordinary skill in the art that the computing system architecture 200 shown in FIG. 2 is merely an example of one suitable computing system and is not intended to suggest any limitation as to the scope of use or functionality of the present invention. Neither should the computing system architecture 200 be interpreted as having any dependency or requirement related to any single component/module or combination of components/modules illustrated therein.

Computing system architecture 200 includes a user device 210, an image capture device 212, a display device 213, a storage device 214 and an image rendering device 216, all in communication with one another via a network 218. The network 218 may include, without limitation, one or more local area networks (LANs) and/or wide area networks (WANs). Such networking environments are commonplace in offices, enterprise-wide computer networks, intranets, and the Internet. Accordingly, the network 218 is not further described herein.

The storage device 214 (shown in FIG. 2 as a database) is configured to store information associated with one or more of image data, image context data, augmented image data, and the like. In various embodiments, such information may include, without limitation, still image data, video image data, three-dimensional model data, 360° image data, panoramic images and the like. In embodiments, the storage device 214 is configured to be searchable for one or more of the items stored in association therewith. It will be understood and appreciated by those of ordinary skill in the art that the information stored in the database 214 may be configurable and may include any information relevant to image data, image context data, augmented image data, and the like. The content and volume of such information are not intended to limit the scope of embodiments of the present invention in any way. Further, though illustrated as a single, independent component, database 214 may, in fact, be a plurality of databases, for instance, a database cluster, portions of which may reside on the user device 210, the image rendering device, 216, another external computing device (not shown), and/or any combination thereof.

Each of the user device 210 and the image rendering device 216 shown in FIG. 2 may be any type of computing device, such as, for example, computing device 100 described above with reference to FIG. 1. By way of example only and not limitation, each of the user device 210 and the image rendering device 216 may be a personal computer, desktop computer, laptop computer, handheld device, mobile handset, consumer electronic device, or the like. It should be noted, however, that the present invention is not limited to implementation on such computing devices, but may be implemented on any of a variety of different types of computing devices within the scope of embodiments hereof.

The image capture device 214 may be any device known to those of ordinary skill in the art that is configured for capturing image data. By way of example only, image capture device 214 may be a digital camera configured for capturing still image data, a camera configured for capturing video image data, and any combination thereof. Generally, though not by way of limitation, image capture devices 214 in accordance with embodiments hereof will be configured for capturing image data having a limited viewing angle relative to image data augmented in accordance with teachings of the present invention.

The display device 213 may be any device known to those of ordinary skill in the art that is configured for receiving image data and presenting (displaying) received image data. By way of example only and not limitation, display device 213 may be an image projection device configured for projecting images onto one or more display surfaces.

As shown in FIG. 2, the image rendering device 216 includes an image receiving component 220, an image context receiving component 222, a panoramic extrapolation component 224, a panoramic display component 226, and a determining component 228. In some embodiments, one or more of the components 220, 222, 224, 226, 228 may be implemented as stand-alone applications. In other embodiments, one or more of the components 220, 222, 224, 226, 228 may be integrated directly into the operating system of the image rendering device 216 or the user device 210. It will be understood by those of ordinary skill in the art that the components 220, 222, 224, 226, 228 illustrated in FIG. 2 are exemplary in nature and in number and should not be construed as limiting. Any number of components may be employed to achieve the desired functionality within the scope of embodiments of the present invention.

The image receiving component 220 is configured to receive image data (e.g., still image data and/or video image data) having a known position and orientation. In one embodiment, the image data and associated position and orientation information may be downloaded (e.g., from image capture device 212) to a computing device (e.g., user device 210) and transmitted to the image receiving component 220 via a network (e.g., network 218). In another embodiment, the image receiving component 220 may receive image data directly from an image capture device (e.g., image capture device 212). Any and all such variations, and any combination thereof, are contemplated to be within the scope of embodiments of the present invention.

In one embodiment, the position and orientation information associated with the image data is defined based upon a coordinate system. In another embodiment, the known position and orientation may be defined based upon one or more known landmarks. Such position and orientation information may be obtained in a variety of ways known to those of ordinary skill in the art including, by way of example only, Global Positioning System (GPS) information, e.g., from a GPS system associated with the image capture device 212, information input by a user (for instance, a user associated with user device 210), and any combination thereof.

The image context receiving component 222 is configured to receive image context data having a known position and orientation. In one embodiment, the image context data is three-dimensional model data received, for instance, from a publicly available database. In another embodiment, the image context data is image data (e.g., still image data, video image data, 360° image data, and the like) stored in association with one or more storage devices (e.g., storage device 214), the image capture device itself, a device associated with the image capture device (e.g., user device 210), and/or any combination thereof.

Position and orientation information associated with the image context data may be defined and received utilizing any of the variations set forth above with respect to the image data. In one embodiment, the image context data includes position and/or orientation information defined based upon a coordinate system that is common between the image data and the image context data. (For the sake of clarity, coordinates associated with the image data are sometimes referred to herein as "image coordinates" and coordinates associated with the image context data are sometimes referred to herein as "context coordinates".)

The panoramic extrapolation component 224 is configured to extrapolate received image data in at least one direction utilizing image context data. In one embodiment, such extrapolation is accomplished by rendering three-dimensional synthetic views of the area surrounding the capture point of the image data (defined, for instance, by the image coordinates). In one embodiment, a full 360° panoramic view is created by generating four synthetic views of the area surrounding the capture point of the image data, each of the synthetic views having an angle of 90°. In such embodiment, one of the synthetic views has the same viewing direction as the image data and the remaining synthetic views are configured to display the surrounding scene. It will be understood by those of ordinary skill in the art that more or fewer than four synthetic views may be utilized depending upon the nature of the output image desired.

Once the synthetic view(s) are rendered, the image data may be is mapped onto at least one of the synthetic views, e.g., the synthetic view having the same viewing direction as the image data. In one embodiment, this is performed by alpha-compositing the image data onto the synthetic view. Alpha-compositing techniques are known to those of ordinary skill in the art and, accordingly, are not further described herein. If desired, feathering of the transition between at least one boundary of the image data and the image context data (e.g., synthetic view) may be performed, as known to those of ordinary skill in the art.

If desired, to obtain a smoother transition between the image data and the synthetic view onto which it is mapped, color matching may be performed. In one embodiment, color matching may be done by a linear mapping between colors. In another embodiment, matching of the color histograms of the image data and the image context data (e.g., synthetic view) may be performed. Image matching techniques are known to those of ordinary skill in the art and it will be understood and appreciated that any and all such techniques, and any combination thereof, may be utilized within the scope of embodiments of the present invention.

The composite images may then undergo a warp into spherical coordinates to generate an image where the horizontal axis thereof represents the azimuth angle, relative to the viewing direction of the image data, and the vertical axis represents the tilt angle. Warping techniques are known to those of ordinary skill in the relevant art and, accordingly are not further described herein.

The panoramic extrapolation component is further configured to generate a panoramic image utilizing the spherical coordinates, the panoramic image having a viewing angle that is augmented relative to the viewing angle of the received image data.

The panoramic display component 226 is configured to transmit the panoramic image generated by the panoramic extrapolation component 224 to at least one display device. In one embodiment, such panoramic image may be transmitted via a network (e.g., network 218) to a stand-alone display device such as display device 213. In other embodiments, the display device may be associated with a computing device (such as computing device 210) or the image capture device itself. Any and all such variations are contemplated to be within the scope of embodiments of the present invention.

In one embodiment, the display device may be a projector device. By way of example only, the projector device may be a projector with a fish-eye lens configured for displaying images in a hemisphere around the device. For instance, if the projector device is mounted toward a front surface (e.g., a wall of a rectangular room), the hemisphere may be configured to cover the three walls or surfaces in front of the viewer. Although the spherical images output from the panoramic extrapolation component 214 will generally be correctly calibrated for the projector device, they may appear distorted when displayed on the room walls. This distortion may be corrected by pre-warping the images with respect to the room geometry. Such pre-warping techniques are known to those of ordinary skill in the art and, accordingly, are not further described herein.

The determining component 228 is configured to determine if image context data is available, e.g., in association with storage component 214, that includes context coordinates that are the same as the image coordinates. If it is determined that such image context data is available, it is accessed and provided to the image context receiving component 222. If, however, it is determined that such image context data is not available, the determining component 228 is configured for identifying available context data that is within a pre-determined proximity of the image data. For instance, if the image data is associated with image coordinates, and image context data having context coordinates identical to the image coordinates is not available, the determining component 228 is configured to identify image context data having context coordinates that are in the vicinity of the image coordinates. Such image context data may have context coordinates that are no more than a pre-determined distance from the image coordinates or the determining component 228 may be configured to identify the image context data having the closest coordinates to the image coordinates, regardless of the actual distance there between. Any and all such variations, and any combination thereof, are contemplated to be within the scope of embodiments of the present invention.

Figure 3:
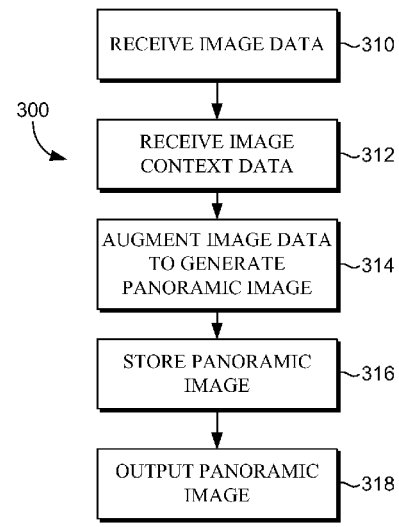
FIG. 3 is a flow diagram illustrating a method for generating panoramic images, in accordance with an embodiment of the present invention.

Turning now to FIG. 3, a block diagram illustrating a method for generating panoramic images, in accordance with an embodiment of the present invention, is shown and designated generally as reference numeral 300. Initially, as indicated at block 310, image data (e.g., still image data or video image data) is received, for instance, utilizing image receiving component 220 of FIG. 2. Subsequently or substantially simultaneously, image context data is received, for instance, utilizing image context receiving component 222 of FIG. 2, as indicated at block 312.

Next, the image data is augmented, e.g., utilizing panoramic extrapolation component 224 of FIG. 2, as indicated at block 314, to generate a panoramic image. One embodiment for augmenting the image data is discussed in more detail below with reference to FIG. 4. Subsequently, the panoramic image is stored, for instance, in association with storage device 214 of FIG. 2, as indicated at block 316. If desired, the panoramic image may be displayed, as indicated at block 318. In embodiments, the panoramic image may be displayed in association with an image capture device (e.g., image capture device 212 of FIG. 2), a user device (such as user device 210 of FIG. 2), an external display device (e.g., display device 213 of FIG. 2), or any combination thereof.

Figure 4:
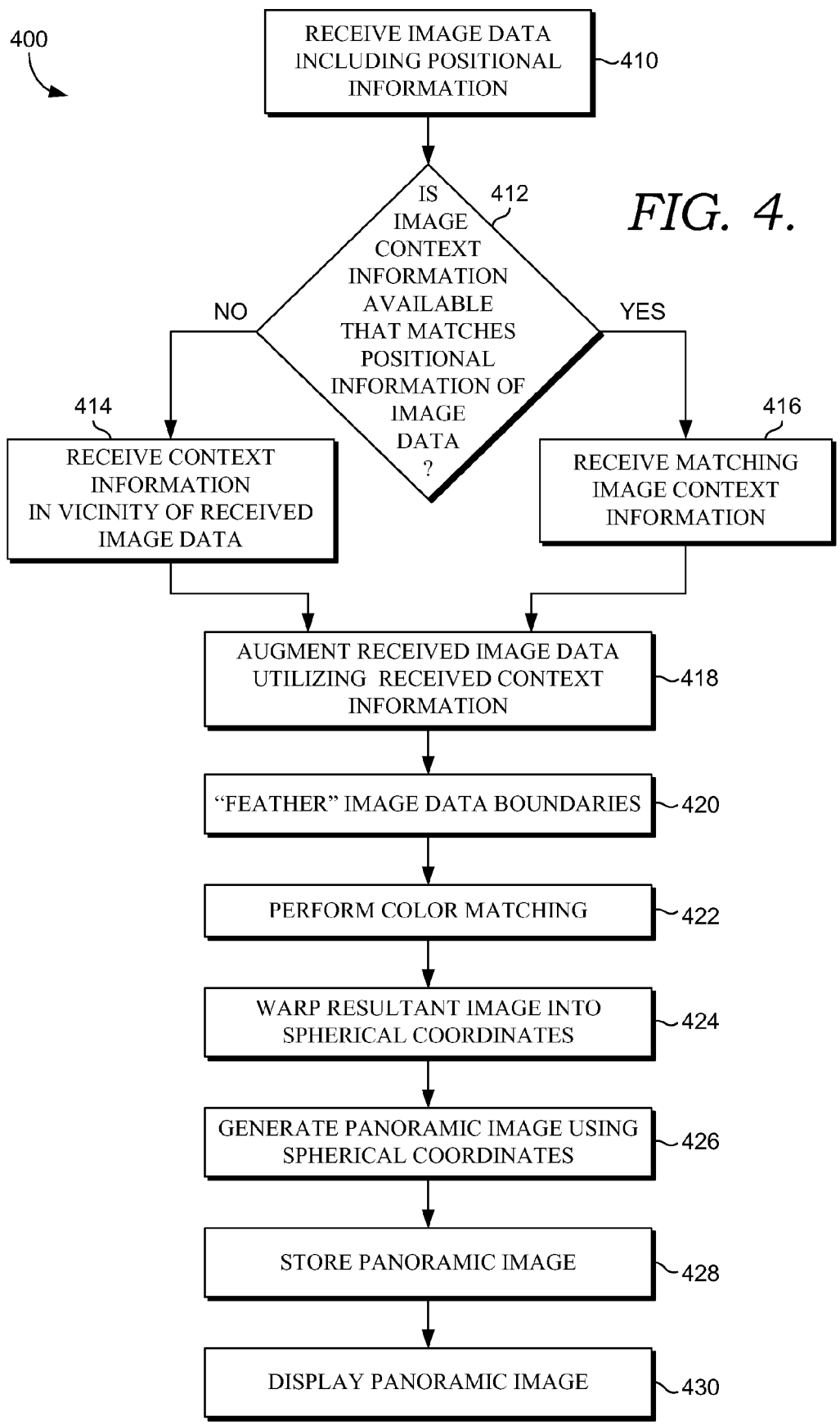
FIG. 4 is a flow diagram showing a method for augmenting image data, in accordance with an embodiment of the present invention.

With reference to FIG. 4, a flow diagram is shown illustrating a method 400, for augmenting image data, in accordance with an embodiment hereof. Initially, image data is received, the image data including positional (e.g., position and orientation) information, as indicated at block 410. Subsequently, as indicated at block 412, it is determined if there is image context information available that matches the positional information associated with the image data. Such determination may be made, for instance, utilizing determining component 228 of FIG. 2. In one embodiment, the positional information received in association with the image data are image coordinates and the image coordinates are compared to context coordinates associated with image context data to determine if a match is available.

If it is determined at block 412 that matching image context information is available, the matching image context information is received, for instance, utilizing image context receiving component 222 of FIG. 2. This is indicated at block 416. If, however, it is determined that matching image context information is not available, image context data having context information in the vicinity of the received image data is received, as indicated at block 414. In one embodiment, if the image data is associated with image coordinates, and image context data having context coordinates identical to the image coordinates is not available, image context data having context coordinates that are in the vicinity of the image coordinates is identified. Such image context data may have coordinates that are no more than a pre-determined distance from the image coordinates or may be the available image context data having the closest coordinates to the image coordinates, regardless of the actual distance there between. Any and all such variations, and any combination thereof, are contemplated to be within the scope of embodiments of the present invention.

Once image context data is received, the image data is augmented utilizing the received image context data, as indicated at block 418. Embodiments for augmenting image data in accordance with embodiments hereof were discussed herein above with reference to FIG. 2. Subsequently, one or more of the image data boundaries may be "feathered" to minimize the visibility of any transitions there between. This is indicated at block 420. Subsequently, simultaneously, or prior to feathering, color matching may be performed, if desired, as indicated at block 422.

Subsequently, the resultant image is warped into spherical coordinates, utilizing techniques known to those of ordinary skill in the art, as indicated at block 424. The spherical coordinates are then utilized to generate a panoramic image, as indicated at block 426. Subsequently, the panoramic image may be stored (as indicated at block 428) and/or displayed (as indicated at block 430).

As can be understood, embodiments of the present invention provide methods and systems (and computer-readable having computer-executable instructions embodied thereon for performing the methods herein described) for augmenting image data (e.g., still image data or video image data) utilizing image context data to generate panoramic images. In accordance with embodiments hereof, a position and orientation of received image data is utilized to identify image context data (e.g., three-dimensional model data and/or 360° image data from another source) rendered based upon the same position or a nearby position relative to the image data and the image data is augmented utilizing the identified context data to create a panoramic image. The panoramic image may then be displayed (e.g., projected) to create a user experience that is more immersive than the original image data could create.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and sub-combinations are of utility and may be employed without reference to other features and sub-combinations. This is contemplated by and is within the scope of the claims.

What is claimed is:

1. One or more computer-storage media having computer-executable instructions embodied thereon for performing a method for generating panoramic images, the method comprising:
receiving video image data having a known position and orientation from a first source, wherein the first source includes a user's image capture device;
receiving image context data from a second source;
extrapolating image data in at least one direction utilizing received image context data to create a panoramic image by rendering a plurality of three-dimensional synthetic views of an area surrounding the capture point of the image data;
alpha-compositing the image data onto at least one of the plurality of synthetic views to create a composite image;
warping the composite image into spherical coordinates;
augmenting the video image data with the image context data; and
storing the generated panoramic image.

2. The one or more computer-storage media of claim 1, wherein receiving video image data having a known position and orientation comprises receiving video image data having coordinates associated therewith.

3. The one or more computer-storage media of claim 2, wherein receiving image context data comprises receiving three-dimensional model data having coordinates associated therewith, the coordinates associated with the received video image data and the coordinates associated with the three-dimensional model data sharing a common coordinate system.

4. The one or more computer-storage media of claim 1, wherein receiving image context data comprises receiving three-dimensional model data.

5. The one or more computer-storage media of claim 1, wherein the received video image data has at least one defined boundary, and wherein augmenting the video image data with the image context data comprises extrapolating the video image data beyond the at least one defined boundary in at least one direction.

6. The one or more computer-storage media of claim 1, wherein the method further comprises displaying the generated panoramic image.

7. The one or more computer-storage media of claim 6, wherein displaying the generated panoramic image comprises projecting the generated panoramic image.

8. A computer-implemented method for augmenting image data, the method comprising:
receiving, at a user's computing device, image data having a known position and orientation, wherein the image data is received from an image capture device;
determining, using the user's computing device, if image context data is available that includes the known position;
if it is determined that image context data is not available that includes the known position, receiving, at the user's computing device, image context data having a position near the known position;
augmenting, using the user's computing device, the image data with the image context data to generate augmented image data, wherein transitions between the image data and the image context data are feathered;
alpha-compositing the image data and warping the augmented image data into spherical coordinates; and
storing the augmented image data on the user's computing device.

9. The method of claim 8, wherein receiving image data having a known position and orientation comprises receiving at least one of still image data and video image data having coordinates associated therewith.

10. The method of claim 9, wherein receiving image context data having a position near the known position comprises receiving three-dimensional model data having coordinates associated therewith, and wherein the coordinates associated with the received image data and the coordinates associated with the three-dimensional model data share a common coordinate system.

11. The method of claim 8, wherein receiving image context data having a position near the known position comprises receiving three-dimensional model data.

12. The method of claim 11, wherein receiving image context data having a position near the known position comprise receiving image context data having coordinates within a pre-determined proximity of the coordinates associated with the image data.

13. The method of claim 8, wherein the received image data includes at least one defined boundary, and wherein augmenting the image data with the image context data comprises extrapolating the image data beyond the at least one defined boundary in at least one direction.

14. The method of claim 8, further comprising displaying the augmented image data.

15. A computerized system for generating panoramic images, the system comprising:
an image receiving component configured for receiving image data having a known position and orientation, wherein the image data is received from a camera;
an image context receiving component that receives image context data having a known position and orientation;
a panoramic extrapolation component that extrapolates received image data in at least one direction utilizing received image context data to create a panoramic image, wherein the panoramic extrapolation component accomplishes the extrapolation by rendering a plurality of three-dimensional synthetic views of an area surrounding the capture point of the image data, alpha-compositing the image data onto at least one of the plurality of synthetic views to create a composite image, and warping the composite image into spherical coordinates; and
a storage component that stores the image context data and the panoramic image.

16. The computerized system of claim 15, further comprising a panoramic display component configured for transmitting the panoramic image to at least one display device.

17. The computerized system of claim 15, wherein the image receiving component is configured for receiving image data having image coordinates associated therewith, and wherein the image context receiving component is configured for receiving image context data having context coordinates associated therewith.

18. The computerized system of claim 17, further comprising a determining component configured for determining if image context data is available that includes context coordinates that are the same as the image coordinates.

19. The computerized system of claim 18, wherein the image context receiving component is further configured to receive image context data having context coordinates within a pre-determined proximity of the image coordinates.

20. The computerized system of claim 15, wherein the camera is configured for capturing video image data and wherein the digital image data includes video image data.

\* \* \* \* \*